United States Patent
Emberty et al.

(10) Patent No.: US 6,725,397 B1
(45) Date of Patent: Apr. 20, 2004

(54) METHOD AND SYSTEM FOR PRESERVING DATA RESIDENT IN VOLATILE CACHE MEMORY IN THE EVENT OF A POWER LOSS

(75) Inventors: Robert George Emberty, Tucson, AZ (US); Craig Anthony Klein, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 09/712,056

(22) Filed: Nov. 14, 2000

(51) Int. Cl.[7] .......................... G06F 13/00; G06F 11/00
(52) U.S. Cl. ........................ 714/24; 713/340; 714/22
(58) Field of Search ................... 714/24, 22; 711/113; 713/340; 318/560

(56) References Cited

U.S. PATENT DOCUMENTS

| | | | |
|---|---|---|---|
| 3,959,778 A | | 5/1976 | Brette |
| 4,460,834 A | | 7/1984 | Gottfried |
| 4,879,475 A | | 11/1989 | Rüge et al. |
| 5,627,946 A | * | 5/1997 | Strang, Jr. ............... 360/77.08 |
| 5,714,941 A | * | 2/1998 | Gandre ..................... 340/671 |
| 5,724,539 A | * | 3/1998 | Riggle et al. .............. 711/100 |
| 5,767,591 A | | 6/1998 | Pinkerton |
| 5,889,629 A | * | 3/1999 | Patton, III ................. 360/75 |
| 5,905,994 A | | 5/1999 | Hori et al. |
| 5,994,794 A | | 11/1999 | Wehrlen |
| 6,239,513 B1 | * | 5/2001 | Dean et al. ................ 307/64 |
| 6,295,577 B1 | * | 9/2001 | Anderson et al. .......... 711/113 |
| 6,417,980 B1 | * | 7/2002 | Liu et al. .................. 360/75 |
| 6,516,426 B1 | * | 2/2003 | Forehand et al. .......... 714/24 |

* cited by examiner

*Primary Examiner*—Scott Baderman
*Assistant Examiner*—Anne L. Damiano
(74) *Attorney, Agent, or Firm*—Dale M. Crockatt; Bracewell & Patterson, L.L.P.

(57) ABSTRACT

A method for preserving data resident in a volatile memory of a data storage unit having at least one rotatable disk platter in the event of an interruption of a primary supply power. The method includes monitoring the status of the primary supply power to the data storage unit. Following the detection of a loss of the primary supply power, kinetic energy inherent in the spinning disk platter is converted into electrical energy. Electrical energy derived from the kinetic energy of the disk platter is then utilized to power the data storage unit to write the data in the volatile memory to an outer-most track of the rotatable disk platter.

20 Claims, 4 Drawing Sheets

METHOD AND SYSTEM FOR PRESERVING DATA RESIDENT IN VOLATILE CACHE MEMORY IN THE EVENT OF A POWER LOSS

BACKGROUND OF THE INVENTION

1. Technical Field

The present invention relates in general to data processing, and in particular to data storage devices. More specifically, the present invention relates to a method and system for preserving data resident in a volatile cache memory in the event of a power loss.

2. Description of the Related Art

As a general rule, central processors can process data significantly more quickly than it can be moved in and out of primary storage. Consequently, the performance of a computer system is substantially limited by the speed of its primary data storage devices and subsystems. In order to ameliorate this perceived "bottleneck," central processor interaction with primary storage may be minimized by storing frequently referenced data in a relatively small, high-speed cache memory located between the processor and the primary storage devices. However, such cache memory, typically utilizing dynamic random access memory (DRAM) devices, is relatively costly per megabyte of storage compared to disk drives and, as such, the cache memory is generally of comparatively limited capacity. Small cache memories function relatively well for repeatedly small data burst loads but poorly for sustained loads.

When utilizing caching techniques, whenever a program issues a "read" command for an instruction or user data, the processor first looks in its cache memory. Should the requested data reside in the cache (a cache "hit"), there is no need to attempt to read from primary storage located generally on one or more disk drives or subsystems. However, if the requested data is not available in the cache (a cache "miss"), the processor must then access primary storage to retrieve the data sought.

Data which must be retrieved from primary storage may then be written to the cache memory, where it may later be accessed by the processor. Alternatively, any data subsequently modified by the processor is also written to the cache memory. Inasmuch as the cache memory has relatively limited storage capacity, a data replacement algorithm is generally used to determine what existing data should be overwritten in the cache memory when additional data is read from primary storage. In this regard, conventional cache memory designs take advantage of a principle known as locality, with the two primary types of locality being referred to as temporal and spatial. The former refers to locality in time, or the tendency of data and subroutines that have been used recently to be used again in the near future. For example, loops in software programs tend to be executed many times, leading to reuse of the instructions in the loop. However, the amount of temporal locality of which a processor memory cache can take advantage of is related to the size of the cache memory, its organization and its data replacement strategy.

Some cache memories utilize an algorithm to "prefetch" data when a cache "miss" occurs. The process of prefetching cache data takes advantage of spatial locality, which refers to the tendency of computer programs to reference information that is located in proximity to recently accessed information. When a cache "miss" occurs, the cache memory prefetches data spatially related to the recently accessed information. Prefetching increases the probability that future cache hits will occur by anticipating the requirement for accesses to the data in the cache memory.

Due to its non-volatility and persistence as compared to cache memory, primary storage must be kept up-to-date, or coherent, with any new data written to the cache memory by the processor to ensure its availability. In this regard, two fundamental techniques are used for coordinating writes to the cache memory with primary storage, namely "write-through" and "write-back" caching. In a write-through cache memory design, the processor writes the modified data to both the cache memory and the primary storage to ensure that both elements always have updated copies of the data. This is the simplest and most widely employed method. On the other hand, a write-back cache keeps track of, and marks, data in the cache memory that has been modified by the processor. When such modified data is ultimately displaced from the cache memory, the data is then written to primary storage. Because data may be modified a number of times prior to being removed from the cache memory, writing data to primary storage only when it is displaced from the cache memory obviates the processor overhead of repeatedly updating primary storage with the same cached data each time it is modified by the processor.

Although utilizing cache memory improves the overall system performance, there are certain attendant risks involved. For example, if the system utilizing the cache memory crashes due, e.g., to a loss of power, the system may not have sufficient time to copy the data in the cache memory back to the non-volatile primary storage. In this case, whatever changes were made to the data may not have been reflected in the primary storage and will be lost.

Accordingly, what is needed in the art is an improved method for caching data that mitigates the above-described limitations in the prior art. More particularly, what is needed in the art is an improved method for preserving data resident in a volatile cache memory in the event of a power loss.

SUMMARY OF THE INVENTION

It is therefore an object of the invention to provide an improved data storage unit.

It is another object of the invention to provide a method for preserving data resident in a volatile memory in the event of an interruption of supply power.

To achieve the foregoing objects, and in accordance with the invention as embodied and broadly described herein, a method for preserving data resident in a volatile memory of a data storage unit having at least one rotatable disk platter in the event of an interruption of a primary supply power. The method includes monitoring the status of the primary supply power to the data storage unit. Following the detection of a loss of the primary supply power, kinetic energy inherent in the spinning disk platter is converted into electrical energy. Alternatively, in another advantageous embodiment, the kinetic energy conversion to electrical energy is accomplished utilizing an auxiliary power generator. The electrical energy derived from the kinetic energy of the disk platter is then utilized to power the data storage unit to write the data in the volatile memory to a non-volatile memory medium in the data storage unit. In a related embodiment, the data storage unit positions a read/write head to an outer-most track of the rotatable disk platter where the data is written. In an advantageous embodiment, following the saving of the data in the volatile memory, the data storage unit parks the read/write head and brakes the spindle motor that is coupled to and operably utilized to spin the rotatable disk platter.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
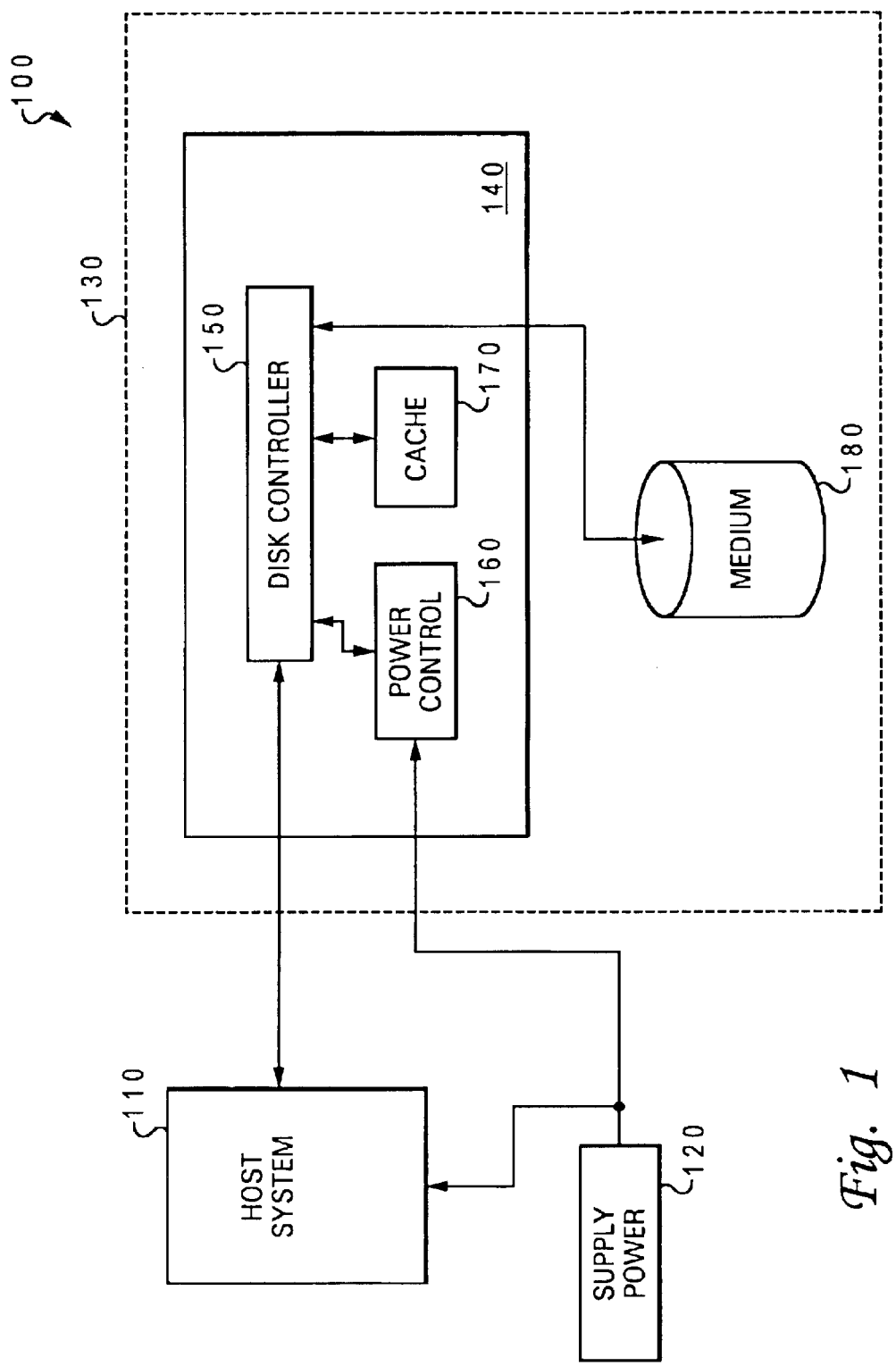
FIG. 1 illustrates an exemplary conventional data processing system that provides a suitable environment for the practice of the present invention.

With reference now to the figures, and in particular, with reference to FIG. 1, there is depicted an exemplary conventional data processing system 100 that provides a suitable environment for the practice of the present invention. As illustrated, data processing system 100 includes a host system, such as a personal computer (PC), that receives input power from a supply power 120 that is typically conventional power-from a local utility. Data processing system 100 also includes a data storage system 130 that includes a controller unit 140 coupled to a non-volatile data storage medium 180. Data storage system 130, in an advantageous embodiment, is a conventional hard disk drive. As shown in the illustrated embodiment, controller unit 140 includes a disk controller 150, such as a microprocessor, coupled to a cache 170 that, in an advantageous embodiment, utilizes volatile memory devices, such as dynamic random access memory (DRAM). Controller unit 140 also includes a power control 160 that is coupled to supply power 120 to provide an interface between supply power 120 and disk controller 150.

Figure 2:
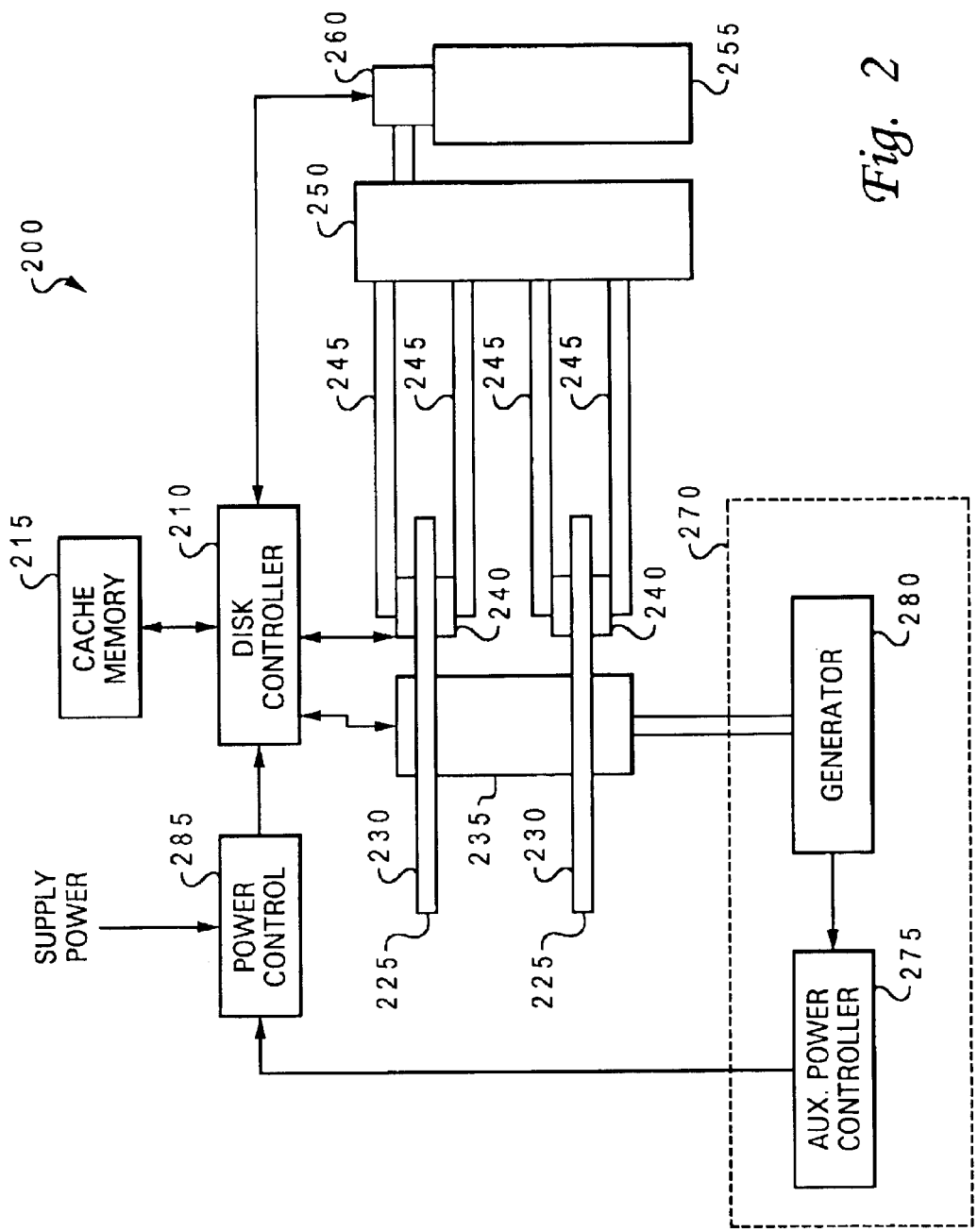
FIG. 2 illustrates an embodiment of a data storage system utilizing an auxiliary generator in accordance with the principles disclosed by the present invention.

Referring now to FIG. 2, there is illustrated an embodiment of a data storage system 200 utilizing an auxiliary generator 270 in accordance with the principles disclosed by the present invention. Data storage system 200 (analogous to data storage system 130 depicted in FIG. 1) is illustrated in a simplified and diagrammatic form sufficient for an understanding of the present invention and includes a controller 210 coupled to a cache memory 215 that, in an advantageous embodiment, is constructed utilizing dynamic random access memories (DRAMs) devices. It should be noted that the utility of the present invention is not limited to the details of any one particular data storage system construction.

Data storage system 200 also includes a stack of rotatable disk platters, generally designated 225, each of which having at least one magnetic surface 230. Disk platters 225 are generally mounted parallel to one another for simultaneous rotation on and by an integrated spindle and motor assembly 235. Information on each magnetic disk surface 230 is read from or written to disk surface 230 by a corresponding transducer head assembly 240 movable in a path having a radial component across rotating disk surface 230.

Each transducer head 240 is mounted on a flexure spring (not shown) carried by an arm 245. Arms 245 are typically ganged together for simultaneous pivotal movement about a support spindle 250. One arm 245 includes an extension driven in pivotal movement by a head drive servo motor 255 that includes a voice coil 260 cooperating with an internal magnet and core assembly. Drive signals applied to voice coil 260 cause arms 245 to move in unison to position transducer heads 240 in registration with information storage tracks on disk surfaces 230 where information is written or read.

Data storage system 200 is controlled in operation by signals provided by controller 210, including motor control and head positioning signals. In a typical arrangement, controller 210 provides an interface with a conventional computer (not shown) that, in an advantageous embodiment, provides data read and write commands. Servo position information is recorded on disk surface 230 and transducer heads 240 read this servo information to provide a servo position signal to controller 210. This information is utilized by controller 210 to provide position control signals. The purpose of this position feedback system is to assure accurate and continuous positioning of transducer heads 240 so that data is written to or read from precise locations on disk surfaces 230.

Currently, small format hard drives generally utilized a brushless DC motor to provide for spindle rotation that are typically in the 5000 to 10,000 RPM range. The present invention recognizes that the rotating spindle and motor assembly 235 provides a source of rotational energy when supply power is no longer being applied to the spindle and-motor assembly, e.g., due to a power failure. The rotating spindle and motor assembly 235, by virtue of its construction, can operate as a power generator utilizing its rotation as an energy source for generating electrical potential. Current disk drive technology utilize this inherent electrical energy to "park the heads" by applying the energy generated by rotation spindle and motor assembly 235 to voice coil 260 to position transducer heads 240 to a predetermined "park" position. Furthermore, after parking transducer heads 240, the remaining electrical energy generated by spindle and motor assembly 235 is "shorted" to electrical ground to provide "dynamic braking" of spindle and motor assembly 235 for whatever rotational energy that remains. Ultimately, transducer heads 240 are parked and spindle and motor assembly 235 have come to rest, i.e., drive rotation has ceased. The present invention expands the utilization of the electrical energy generated by the spinning spindle and motor assembly 235 after its supply power has been interrupted to write the data resident in cache memory 215 to a non-volatile memory, i.e., disk platters 225, prior to parking transducer heads 240 and braking spindle and motor assembly 235.

Alternatively, in another advantageous embodiment, an auxiliary power generator is utilized to take advantage of the rotational energy present in the rotating spindle and motor assembly 235 to generate electrical energy that, in turn, is utilized to write the data in cache memory 215 to a non-volatile memory device. In the illustrated embodiment, an auxiliary power generator 270 is depicted coupled to integrated spindle and motor assembly's 235 spindle and is utilized to convert kinetic energy inherent in the spinning disk platters 225 to electrical energy that can, in turn, be utilized to provide power to data storage system 200. Auxiliary power generator 270 includes a generator 280 that generates electrical energy and an auxiliary power controller 275 that, in turn, rectifies and conditions the electrical energy before it is supplied to disk controller 210 via a power control 285. Power control 285, in an advantageous embodiment, is a conventional switching device, such as a two-position relay switch. In normal operation, i.e., supply power is available, the supply power will energize a relay that positions the switch to coupled disk controller 210 to the supply power. In the event of a loss of supply power, the relay will de-energize switching the power source to auxiliary power generator 270. It should be readily apparent to those skilled in the art that power control 285, in other embodiments, may also be implemented with switching devices, such as transistors, with conventional logic circuits that are well known in the art. Generator 280, in an advantageous embodiment, includes a rotor component (not shown), coupled to the spindle of spindle and motor assembly 235, and a stator component (not shown). The construction and operation of an exemplary auxiliary power generator, including its rotor and stator components, are disclosed in U.S. Pat. No. 5,714,941, entitled "Integral Information and Energy Storage System," which is herein incorporated in its entirety by reference.

The operation of data storage system 200 with respect to an interruption of power will hereinafter be described in greater detail with respect to FIGS. 3 and 4, with continuing reference to FIG. 2, that illustrate power-down and power-up process flows of data storage system 200, respectively, according to the principles disclosed by the present invention.

Figure 3:
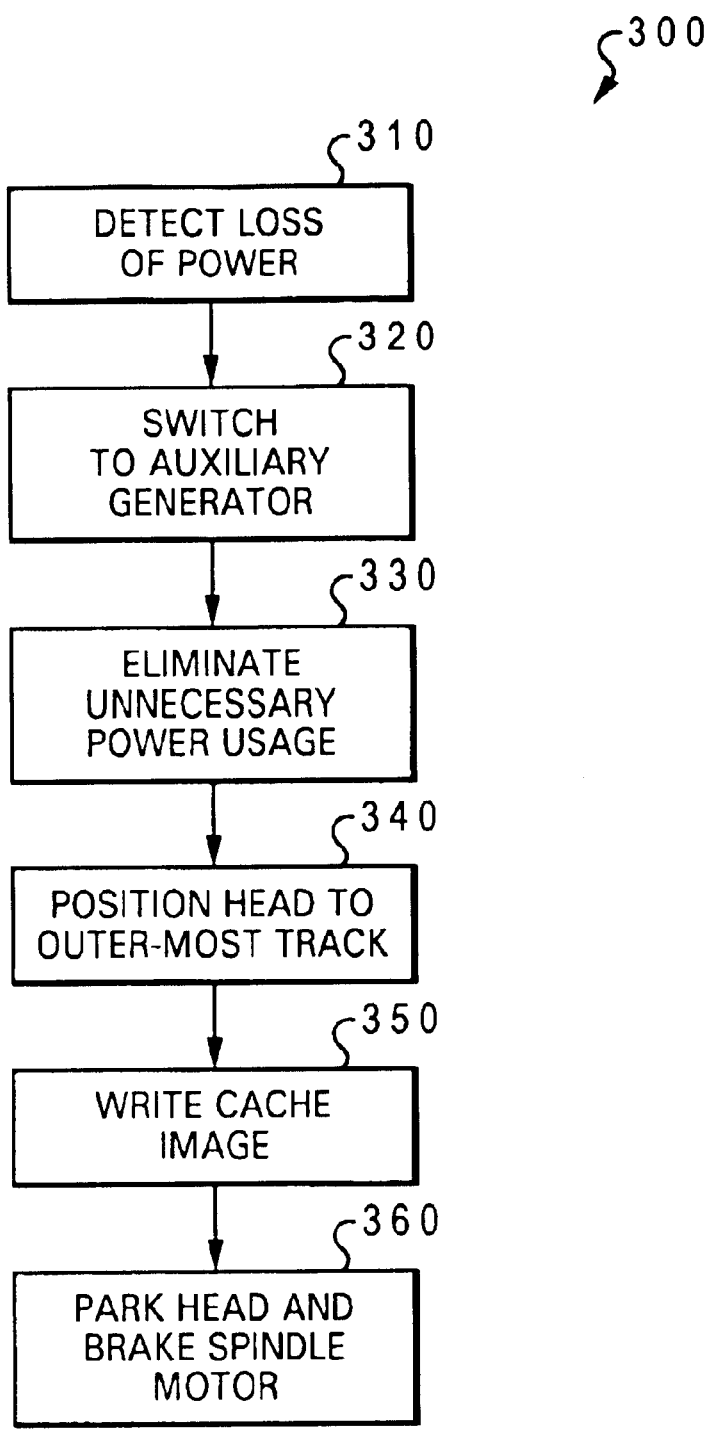
FIG. 3 illustrates an embodiment of a process flow for preserving data resident in cache memory in the event of an interruption of supply power.

Referring now to FIG. 3, there is depicted an embodiment of a process flow 300 for preserving data resident in cache memory 215 in the event of an interruption of supply power. Process 300 is initiated, as illustrated in step 310, when a loss of supply power is detected by power control 285. Following the detection of a loss of supply power, the electrical energy discussed previously that is generated by spindle and motor assembly 235 is redirected to power the write circuits in transducer heads 240 before transducer heads 240 are parked. Alternatively, if an auxiliary power generator is employed, power control 285 will switch the source of input power to disk controller 210 from the regular supply power to auxiliary power generator 270, as depicted in step 320. Power control 285 will also generate a power interrupt signal to inform disk controller that an interruption of primary supply power. In an advantageous embodiment, disk controller, in response to the receipt of the power interrupt signal will initiate a power interrupt handler program to eliminate any unnecessary power usage in data storage system 200, as illustrated in step 330.

Next, as depicted in step 340, a transducer head 240 is positioned at the outer-most track of a disk platter that is typically a reserved section of the disk platter that is not utilized for storing data in the normal operation of data storage system 200. It should be noted that as electrical energy is being removed from the spinning spindle and motor assembly 235 or, alternatively, from auxiliary power generator 270, spindle and motor assembly's 235 rotational speed will decrease. The reduction in spindle and motor assembly 235 rotational speed is further compounded by frictional losses in the spindle bearings (not shown). Therefore, at the beginning of the cache write operation, the rotational speed of the disk platters will be at a maximum, whereas at the end of the cache write operation, the rotational speed of the disk platters will be considerably less. Thus, with a fixed write clock, as the rotational speed of spindle and motor assembly 235 decreases, the bit cell density will continue to rise.

With the variation in the rotational speed, the read circuit phase-locked-loop will be unable to "capture" the read data and restore the clock signal for read data purposes. To overcome this problem, the present invention prewrites a clock track with the write clock frequency. During the cache write operation as the contents in cache memory 215 is written onto the disk platter, the prewritten clock is read and provided to the write circuits in transducer heads 240 as the actual write clock signal. Therefore, when cache memory's 215 contents are being written to the disk platter during a power fail situation, with the rotational speed of spindle and motor assembly 235 continuing to decrease, the bit cell time remains constant, i.e., slower rotational speed corresponds to a slower clock signal.

Subsequently, after the transducer head has been positioned, the cache image that is present in cache memory 215 is written onto the disk platter along with a header that identifies the written data as saved cache data, as illustrated in step 350. After the data in cache memory 215 has been written onto the disk platter, process 300 completes the shutdown operation by parking the transducer heads and if spindle and motor assembly 235 has not come to rest, i.e., stop rotating, the spindle motor brakes (not shown) will be applied to stop the spindle and motor assembly 235 from spinning, as depicted in step 360.

Figure 4:
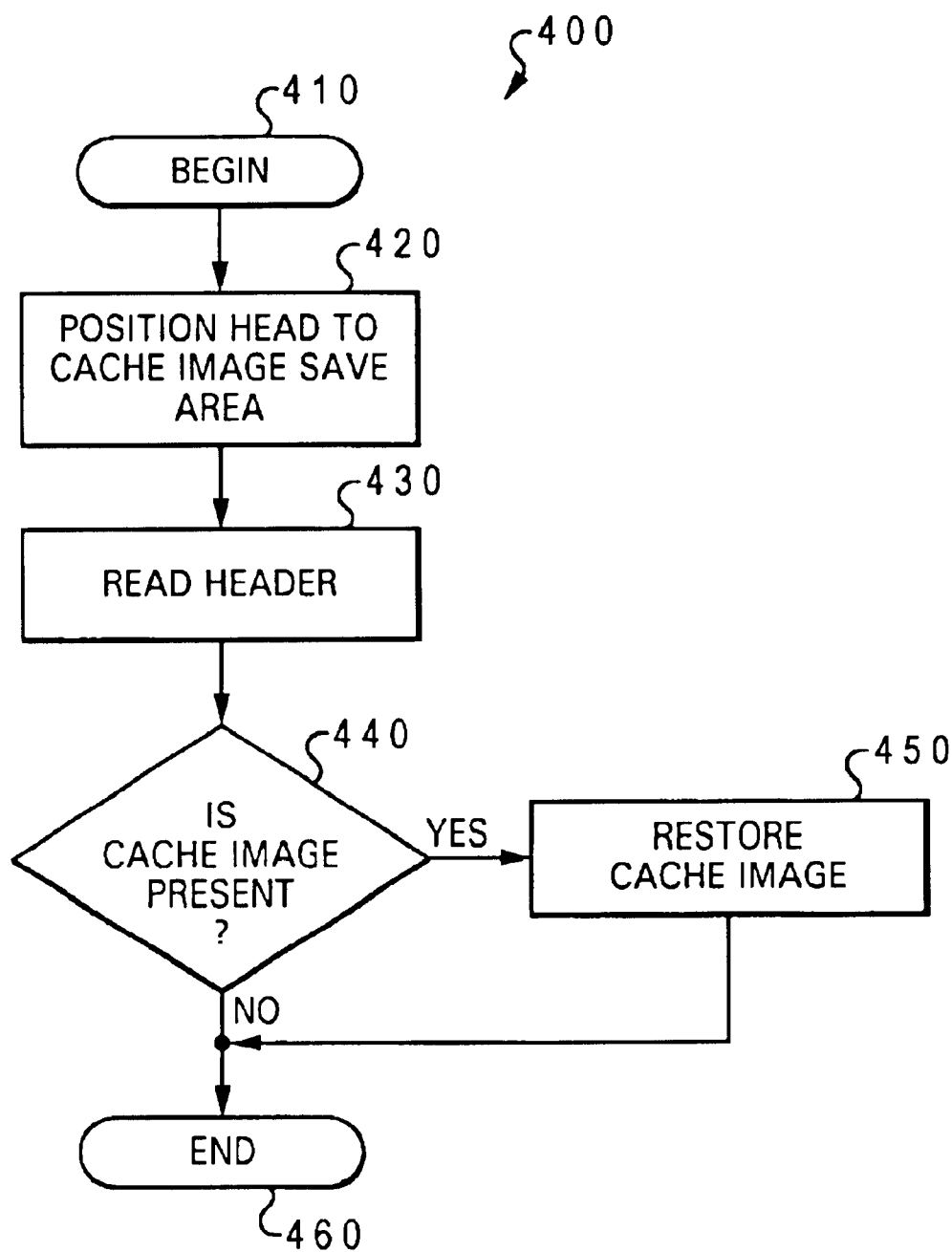
FIG. 4 illustrates an embodiment of a power-up process flow following an interruption of primary supply power in accordance with the principles disclosed by the present invention.

Turning now to FIG. 4, there is illustrated an embodiment of a power-up process flow 400 following an interruption of primary supply power in accordance with the principles disclosed by the present invention. Power-up process 400 is initiated, as depicted in step 410, when power control 285 detects the presence of primary supply power and generates a control signal to inform disk controller 210 that primary supply power is available. Disk controller 210, in turn, will begin to initiate start-up operations and position a transducer head to the cache image save area, i.e., outer-most track, of a disk platter, as illustrated in step 420. After the transducer head has been positioned over the cache image save area, the header information stored on the track is read, as depicted in step 430. Subsequently, as illustrated in decisional step 440, the information contained in the header is evaluated to determine if a cache image is present on the disk platter. If it is determined that a cache image is present, the cache image is read and written back to cache memory 215, as depicted in step 450. After, the cache image has been restored in cache memory 215, process 400 is terminated, as illustrated in step 460 with data storage system 200 resuming normal operations. On the other hand, if it is determined that a cache image is not present on the disk platter indicating, for example, that the prior shut-down of data storage system 200 was not due to a loss of primary supply power, power-up process 400 is also terminated at step 460 with data storage system 200 resuming normal operations.

In another advantageous embodiment, processes 300 and 400 may be implemented in a data processing system, such as a personal computer (PC), employing the data storage system 200 disclosed by the present invention and programmed to execute the method described hereinabove. Accordingly, in an advantageous embodiment, sets of instructions for executing the method disclosed herein are resident in RAM of one or more of the data processing system. These instructions may reside in various types of signal-bearing media. In this respect, one aspect of the present invention concerns a programmed product that includes signal-bearing media tangibly embodying a program of machine-readable instructions executable by a digital data processor to perform the error and detection method described above. The present invention does not contemplate limiting its practice to any particular type of signal-bearing media, i.e., computer readable medium, utilized to actually carry out the distribution. Examples of signal-bearing media includes recordable type media, such as floppy disks and hard disk drives, and transmission type media such as digital and analog communication links and wireless. In other advantageous embodiments, the computer program product may also be stored at another computer and transmitted to a user's computer system by an internal or external communication network, e.g., LAN or WAN, respectively.

While the invention has been particularly shown and described with reference to a preferred embodiment, it will be understood by those skilled in the art that various changes in form and detail may be made therein without departing from the spirit and scope of the invention.

What is claimed is:

1. A method for preserving data resident in a volatile memory of a data storage unit having at least one rotatable disk platter in the event of an interruption of a normal supply power, said method comprising:

monitoring the status of said normal supply power to said data storage unit;

converting kinetic energy in said at least one rotatable disk platter into electrical energy in response to detecting a loss of said normal supply power to said data storage unit; and with the use of said electrical energy converted from said kinetic energy, writing said data to a reserved section, of said at least one rotatable disk platter, that is not utilized for storing data in a normal operation of said data storage unit, said normal operation being a condition in which there is not a loss of said normal supply power to said data storage unit.

2. The method as recited in claim 1, wherein the reserved section of said at least one rotatable disk platter is an outer-most track of said at least one rotatable disk platter.

3. The method as recited in claim 2, further comprising:

parking a read/write head; and braking a spindle motor coupled to and operably utilized to spin said at least one rotatable disk platter.

4. The method as recited in claim 1, further including restoring said data back to said volatile memory in response to detecting a resumption of said normal supply power.

5. The method of claim 4, wherein said data written to said reserved section includes a header identifying said data as a saved cache data from a cache memory.

6. The method as recited in claim 1, wherein said volatile memory is a cache memory of said data storage unit.

7. The method as recited in claim 1, further comprising:

upon said loss of said normal supply power, adjusting a write clock signal to decrease in a manner corresponding with a decreasing rotational speed of said at least one rotatable disk platter, wherein a bit cell density of data written to said at least one rotatable disk platter during said writing step remains constant.

8. A data storage unit, comprising:

a controller having a volatile memory;

a non-volatile storage medium having at least one rotatable disk platter;

a motor connected to said at least one rotatable disk platter for rotating said at least one rotatable disk platter;

an auxiliary power generator, coupled to said non-volatile storage medium, that converts kinetic energy in said at least one rotatable disk platter into electrical energy upon a loss of a normal supply power to said motor;

a power control that monitors a status of said normal supply power to said motor; and means for preserving data resident in said volatile memory in the event of a loss of said normal supply power to said motor by writing said data to said at least one rotatable disk platter using said electrical energy converted from said kinetic energy, said data being written to a reserved section, of said at least one rotatable disk platter, that is not utilized for storing data in a normal operation of said data storage unit, said normal operation being a condition in which there is not a loss of said normal supply power to said motor.

9. The data storage unit as recited in claim 8, wherein said volatile memory is a cache memory of said data storage unit.

10. The data storage unit as recited in claim 8, wherein said auxiliary power generator includes a generator coupled to a spindle connected to said at least one rotatable disk platter.

11. The data storage unit as recited in claim 8, further comprising:

means for, upon said loss of said normal power supply, adjusting a write clock signal to decrease in a manner corresponding with a decreasing rotational speed of said at least one rotatable disk platter, wherein a bit cell density of data written to said at least one rotatable disk platter during said writing step remains constant.

12. The data storage unit as recited in claim 8, wherein the reserved section of said at least one rotatable disk platter is an outer-most track of said at least one rotatable disk platter.

13. The data storage unit as recited in claim 8, further comprising means for restoring said data back to said volatile memory in response to a resumption of said normal supply power, wherein said data written to said reserved section includes a header identifying said data as a saved cache data from said cache memory.

14. A computer program product, comprising:

a computer-readable medium having stored thereon computer executable instructions for implementing a method for preserving data resident in a volatile memory of a data storage unit having at least one rotatable disk platter in the event of an interruption of a normal supply power, said computer executable instructions when executed perform the steps of:

monitoring the status of said normal supply power to said data storage unit;

converting kinetic energy in said at least one rotatable disk platter into electrical energy in response to detecting a loss of said normal supply power to said data storage unit; and with the use of said electrical energy converted from said kinetic energy, writing said data to a reserved section, of said at least one rotatable disk platter, that is not utilized for storing data in a normal operation of said data storage unit, said normal operation being a condition in which there is not a loss of said normal supply power to said data storage unit.

15. The computer program product as recited in claim 14, wherein the reserved section of said at least one rotatable disk platter is an outer-most track of said at least one rotatable disk platter.

16. The computer program product as recited in claim 14, said computer executable instructions when executed performing the further steps of:

parking a read/write head; and braking a spindle motor coupled to and operably utilized to spin said at least one rotatable disk platter.

17. The computer program product as recited in claim 14, said computer executable instructions when executed performing the further step of restoring said data back to said volatile memory in response to detecting a resumption of said normal supply power.

18. The computer program product as recited in claim 17, wherein said data written to said reserved section includes a header identifying said data as a saved cache data from a cache memory.

19. The computer program product as recited in claim 14, wherein said volatile memory is a cache memory of said data storage unit.

20. The computer program product as recited in claim 14, said computer executable instructions when executed performing the further step of:

upon said loss of said normal power supply adjusting a write clock signal to decrease in a manner corresponding with a decreasing rotational speed of said at least one rotatable disk platter, wherein a bit cell density of data written to said at least one rotatable disk platter during said writing step remains constant.

* * * * *